United States Patent Office 3,465,055
Patented Sept. 2, 1969

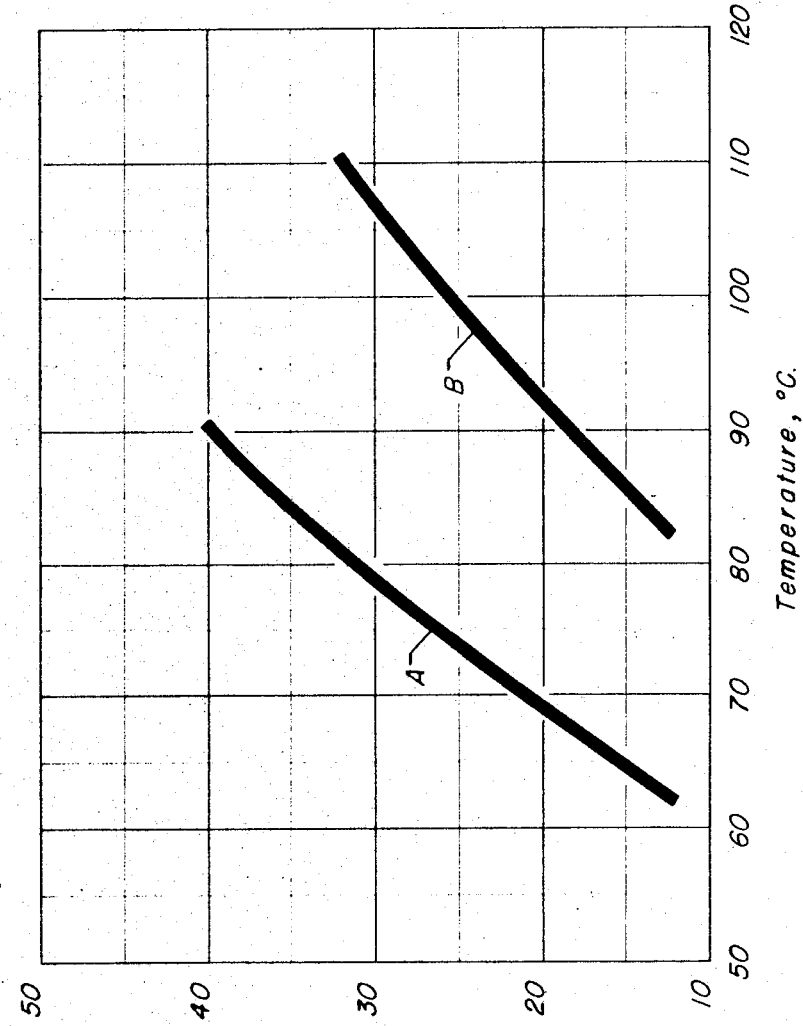

3,465,055
XYLENE SEPARATION PROCESS
William K. T. Gleim, Island Lake, Richard C. Wackher, Palatine, and Frederick C. Ramquist, Stickney, Ill., assignors to Universal Oil Products Company, Des Plaines, Ill., a corporation of Delaware
Filed Feb. 13, 1967, Ser. No. 615,641
Int. Cl. C07c 15/08, 7/10
U.S. Cl. 260—674   10 Claims

ABSTRACT OF THE DISCLOSURE

Method for separating para xylene from a hydrocarbonaceous feed having $C_8$ aromatics contained therein, wherein the feed is contacted with an aqueous solution of α-dextrin to selectively form a para xylene-α-dextrin clathrate.

---

This invention relates to a process for separating para xylene feed containing a mixture of $C_8$ aromatics. More specifically, this invention relates to a process for the separation of para xylene from a hydrocarbon mixture containing para xylene and meta xylene. The invention further relates to the recovery of substantially pure para xylene from a hydrocarbon feed stream containing para xylene and meta xylene.

In one of its embodiments, this invention relates to a process for separating para xylene from a fluid mixture comprising $C_8$ aromatic hydrocarbons which comprises contacting the mixture with an aqueous solution of α-dextrin under conditions to selectively form a solid para-xylene clathrate and separating the solid clathrate from the remaining mixture.

In another of its embodiments, this invention relates to a crystalline material having a composition expressed in terms of a molecular ratio as follows:

1.0 α-dextrin: 0.7±0.3 para xylene and an X-ray powder diffraction pattern essentially the same as that shown in Table 2.

There are four principal isomers in the $C_8$ aromatic hydrocarbon class, namely, ethylbenzene, ortho xylene, para xylene and meta xylene. All have high commercial value when in the substantially pure form. For example, ethylbenzene is a precursor in the preparation of styrene, ortho xylene is a precursor in the preparation of phthalic acid, para xylene is a precursor in the preparation of terephthalic acid and meta xylene is a precursor in the preparation of isophthalic acid. In order to prepare these specialty chemicals, the $C_8$ aromatics must be available in a substantially pure form, separate from their isomers. Generally $C_8$ aromatics are produced from petroleum processing units such as catalytic reformers and are readily separated from other more saturated hydrocarbons such as $C_8$ paraffins, naphthenes, etc. by solvent extraction of the like. A typical $C_8$ aromatic fraction derived from petroleum contains from 8–14% ethylbenzene, 18–24% ortho xylene, 17–21% para xylene and 45–53% meta xylene. Other sources of $C_8$ aromatics include cracking processes, coal tar, etc. Said fraction may be used as a relatively low value fuel such as a blending component to produce a high octane gasoline or as a solvent. In order to utilize the $C_8$ aromatic mixture as a high value product, the $C_8$ isomers must be separated. Ortho xylene is easily separated from the $C_8$ aromatic mixture by ordinary fractionation as it has a sufficiently high boiling point when compared to the other $C_8$ aromatics to render separation by fractionation a commercially feasible operation. Although it is more difficult to separate ethylbenzene from the ortho xylene free $C_8$ aromatic mixture, nevertheless, it can be economically accomplished by direct fractionation using a more extensive fractionator and in fact is being commercially practiced. However, it is not economically feasible to separate meta and para xylene from each other by direct fractionation. Since the meta and para xylene boiling points are so close, it would take an immense fractionator with many hundreds of trays to achieve this separation which would not be economical. Other methods have been employed in the past to achieve the separation of para xylene from meta xylene such as fractional crystallization. However, this freezing method involves the handling of solids, the utilization of less than ambient temperatures with a high concentration of para xylene in the liquid at the eutectic point all of which make such a separation expensive.

It is an object of this invention to economically separate para xylene from a mixture of para and meta xylene.

It is another object of this invention to economically separate and recover para xylene from a $C_8$ aromatic hydrocarbon mixture.

It is still another object of this invention to separate para xylene from a mixture of para and meta xylenes by contacting said mixture with an aqueous solution of α-dextrin is employed to form selective clathrates.

These and other objects will become more apparent in the light of the following detailed description.

The drawing shows a plot of the stability of para xylene and meta xylene clathrates as a function of α-dextrin concentration against temperature.

The heart of the present method lies in the unexpected discovery that α-dextrin selectively forms a clathrate with para xylene (as compared to other $C_8$ aromatics) in an aqueous solution and that the para xylene clathrate is more stable than the meta xylene clathrate. The α-dextrin is an oligosaccharide of the Schardinger Dextrin family prepared by the action of *Bacillus macerans* on starch and is composed of the following basic glucose units:

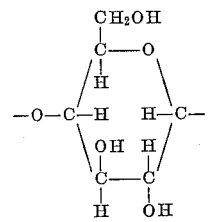

In its pure form, it is a solid crystalline material having the following X-ray diffraction pattern shown in Table 1.

TABLE 1.—X-RAY POWDER PATTERNS FOR α-DEXTRIN

| d-Value: | Intensity |
|---|---|
| 15.0 | 10 |
| 9.4 | 40 |
| 7.5 | 100 |
| 6.6 | 40 |
| 6.3 | 50 |
| 5.9 | 30 |
| 5.6 | 40 |
| 5.2 | 10 |
| 4.85 | 30 |
| 4.60 | 40 |
| 4.42 | 50 |
| 4.10 | 100 |
| 3.95 | 30 |
| 3.71 | 40 |
| 3.48 | 30 |
| 3.25 | 40 |
| 3.08 | 30 |
| 2.92 | 40 |
| 2.80 | 20 |

TABLE 1—Continued

| $d$-Value: | Intensity |
|---|---|
| 2.70 | 20 |
| 2.62 | 10 |
| 2.54 | 20 |
| 2.42 | 20 |
| 2.32 | 20 |
| 2.25 | 20 |

The α-dextrin is formed by the linkage of six of the above glucose units with the last unit being attached to the first unit to form a cyclic structure. Its skeletal structure without H, OH, and C groups shown is believed to be as follows:

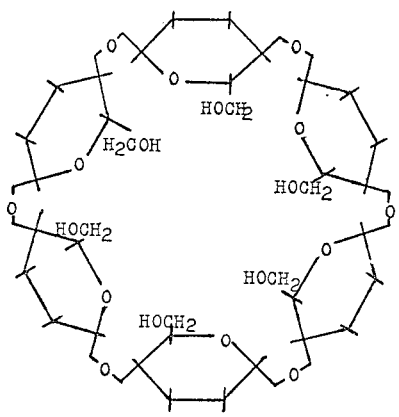

Similarly, β and γ-dextrins are composed of 7 and 8 ring glucose units respectively and are known to form clathrates. The Schardinger Dextrines and their method of preparation are described in detail in an article published in 1957 entitled, "Advances in Carbohydrate Chemistry," volume 12, Academic Press, Inc. Publishers, pages 189–260 by Dexter French. The teachings contained therein are incorporated by reference herein.

It has been found that all the $C_8$ aromatics will form solid clathrates with α-dextrin but that the selectivity of clathrate formation and the stability of the resulting clathrate are widely different, in fact, sufficiently different to make possible economical separation of the individual $C_8$ aromatic isomers. The stability is a function of the temperature and the initial concentration of α-dextrin in the aqueous phase. There are specific conditions under which one or more of the $C_8$ aromatic-α-dextrin clathrates are unstable and by suitable adjustment of process variables a process for the continuous separation of $C_8$ aromatics is readily designed. As an example of the selectivity variation, the relative tendency to form clathrates with α-dextrin at 73° C. (assuming meta xylene to be 1.0) is as follows: meta xylene=1; para xylene=5; ortho xylene=0.7; ethylbenzene=3. Therefore, the ratio of selectivity of para to meta xylene is 5, of para to ortho xylene is 7.1 and para xylene to ethylbenzene is 1.66. These selectivity differences will permit the separation of the para xylene from a mixture of all the $C_8$ aromatic isomers, the separation of para xylene and ethylbenzene from a mixture of all the $C_8$ aromatic isomers and from each other, etc. It is of primary interest to recover pure para xylene and the method of the present invention permits a simple economical way to attain this objective. By proper multistaging, it is possible to recover pure para xylene. It is also possible to remove ortho xylene from the $C_8$ aromatic mixture by fractionation and to separate the para xylene, the ethylbenzene and the meta xylene from each other by the method of the present invention.

Broadly, the separation is accomplished by contacting the fluid $C_8$ aromatic hydrocarbon mixture with an aqueous solution of α-dextrin and separating the resulting solid clathrate from the fluid phase. The solid clathrate is then exposed to an atmosphere wherein the clathrate is destroyed thus freeing the $C_8$ aromatic, which is recovered. When the hydrocarbon mixture is in the vapor phase, it generally is not necessary to separate the solids from the surrounding liquid. The solids-liquid mixture can be introduced into a decomposition zone as a slurry. The decomposition of the clathrate may also be attained by heating the solid clathrate to a sufficiently high temperature preferably in the presence of water. It has been found that a suitable decomposition temperature is about 100° C. or slightly below when using atmospheric or subatmospheric pressures. In some cases, the clathrate formation step is carried out at temperatures less than 20° C. lower than the decomposition step. Generally, however, the temperature in the clathrate forming step is at least 5° C. lower than the clathrate decomposition step. This permits a relatively small heating and cooling load which reduces the operating costs in a continuous process.

In theory, one mole of para xylene forms a solid clathrate with one mole of α-dextrin but in practice, it has been found that there is excess α-dextrin in the solid clathrate. The chemical composition of the para xylene clathrate may be represented by the molecular ratio: 1.0 α-dextrin:0.7±0.3 para xylene. This clathrate is a crystalline material and may be further characterized by an X-ray diffraction pattern analysis. The following Table 2 shows the $d$-values in angstroms measured from a 114.7 mm. diameter X-ray diffraction powder pattern for a para-xylene-α-dextrin complex. The relative line intensities are visual estimates from the film.

TABLE 2

| $d$-Value: | Intensity |
|---|---|
| 14.50±0.2 | 40 |
| 12.20±0.2 | 30 |
| 11.40±0.2 | 30 |
| 9.70±0.1 | 10 |
| 8.80±0.1 | 10 |
| 7.90±0.1 | 80 |
| 7.40±0.1 | 80 |
| 6.90±0.1 | 100 |
| 6.60±0.1 | 20 |
| 6.20±0.1 | 20 |
| 5.90±0.1 | 50 |
| 5.70±0.1 | 50 |
| 5.10±0.1 | 40 |
| 4.80±0.05 | 40 |
| 4.60±0.05 | 100 |
| 4.42±0.05 | 10 |
| 4.20±0.05 | 10 |
| 4.10±0.05 | 30 |
| 4.00±0.05 | 10 |
| 3.90±0.05 | 30 |
| 3.72±0.05 | 40 |
| 3.60±0.05 | 10 |
| 3.50±0.02 | 10 |
| 3.35±0.02 | 30 |
| 3.20±0.02 | 30 |
| 3.10±0.02 | 20 |
| 2.99±0.02 | 30 |
| 2.78±0.02 | 40 |
| 2.69±0.02 | 10 |
| 2.53±0.02 | 20 |
| 2.42±0.02 | 20 |
| 2.36±0.02 | 10 |
| 2.30±0.02 | 20 |
| 2.26±0.02 | 20 |

It has been found, for example, that in an initial 30 weight percent α-dextrin aqueous solution, the addition of meta xylene shows that a meta xylene-α-dextrin clathrate is unstable above about 79° C. whereas a corresponding para xylene-α-dextrin clathrate is stable at temperatures up to about 107° C. It becomes theoretically possible to attain complete separation of pure para xylene from a fluid mixture of meta and para xylene.

It has been found that the solid clathrate of para xylene and α-dextrin is more stable than the corresponding meta xylene clathrate. Indeed, the solid para xylene complex will withstand temperatures of about 20° C. higher than the meta xylene complex over wide ranges of α-dextrin solution concentrations. This surprising result allows the para xylene complex to exist as a stable material at conditions under which the meta xylene complex would no longer exist. It specifically has been found that a pure meta xylene-α-dextrin clathrate is unstable above 80° C. when the initial concentration of α-dextrin in the aqueous solution is below about 31.5 weight percent while the corresponding pure para xylene clathrate is stable as long as the corresponding α-dextrin concentration is above about 10.5 weight percent. It has also been found that a pure meta xylene-α-dextrin clathrate is unstable above 90° C. when the initial concentration of the α-dextrin in the aqueous solution is below about 40 weight percent while the corresponding pure para xylene clathrate is stable as long as the corresponding α-dextrin concentration is above about 18.5 weight percent. These results are shown graphically in the accompanying drawing. Line A represents the stability curve for the meta xylene clathrate and Line B represents the stability curve for para xylene clathrate. These results were obtained by placing in a container an aqueous solution of α-dextrin having the specified initial concentration. In determining Line A, excess pure meta xylene liquid is added to the container and mixed therein. The temperature surrounding the container was increased slowly until the temperature at which the disappearance of solid clathrate was visually apparent was determined. The temperature was increased several degrees above this temperature, allowed to stand until equilibrium was attained and then the temperatures slowly lowered. The temperature at which solid clathrate started to appear was noted. It was found that these two temperatures were about the same and is plotted as a broad Line A in the drawing. Other points on Line A were determined by utilizing a different initial α-dextrin concentration and determining the corresponding temperatures. Line B was determined by using para xylene instead of meta xylene. Therefore, it becomes readily apparent that in the region between Lines A and B a new composition has been discovered since heretofore it has not been known that para xylene α-dextrin clathrate would still exist as a solid phase complex whereas meta xylene clathrate would not. Therefore, and more specifically, a new crystalline composition has been found to exist having a molecular ratio of:

1.0 α-dextrin:0.7±0.3 para xylene and an X-ray diffraction pattern as shown in Table 2. The novelty of this composition is most apparent at a temperature of from about 80° C. to about 90° C. in the presence of an aqueous solution of α-dextrin having an initial α-dextrin concentration above from about 10.5 weight percent to about 18.5 weight percent respectively and below from about 31.5 weight percent to about 40 weight percent respectively. The temperature and concentration range intermediate between the above limits may be obtained by linear interpolation since in this narrow region, lines A and B are nearly linear as shown in the drawing. Thus, at 85° C. the para xylene clathrate is stable but the meta xylene clathrate is not if the initial α-dextrin concentration is above about 14.5 weight percent and below about 36 weight percent.

Suitable concentrations of α-dextrin in the initial aqueous solution are from about 5% by weight up to about 54% by weight although preferable concentrations are from about 30 to about 50 weight percent. The temperature employed in the clathrate forming step and the decomposition step is dependant on the concentration of α-dextrin in the final aqueous solution. Suitable temperatures are from about 30° C. to about 120° C. The clathrate formation step is suitably maintained at a lower temperature (in the order of from about 5 to about 25° C. differential) than the clathrate decomposition step. Preferably the clathrate formation step is maintained at from about 50° C. to about 90° C. and the clathrate decomposition step is maintained at from about 70° C. to about 110° C. Suitable pressures maintained during these steps are from about 0.1 atmosphere (absolute) to about 100 atmospheres, although preferably the pressure is maintained near atmospheric especially at from about 0.4 atmosphere (absolute) to about 4 atmospheres.

The fluid $C_8$ aromatic mixture may be in the liquid or the vapor phase when contacting the liquid aqueous α-dextrin solution. When using the hydrocarbon in the liquid phase agitation means should be provided in order to increase the interfacial area between these immiscible phases. In many cases, it is preferred to maintain the hydrocarbon in the vapor phase since this improves the contact with the aqueous solution and also prevents solids clogging at the interface. In either event, a solid clathrate forms which is separated from the liquid phase (or phases). The solid clathrate is subjected to conditions such that the solid is decomposed thus freeing the $C_8$ aromatic which is subsequently recovered.

The following examples are presented to further illustrate the utility and results that are obtained from the method of our invention. It is not intended, however, to limit the scope of the invention to the reactants and operating conditions disclosed therein.

Example 1

An apparatus is constructed out of two vessels connected together in series such that as gas non-reactive or non-condensible at the test conditions, such as nitrogen, methane, etc. is bubbled through the liquid contained in the first vessel and the vapor from the first vessel is bubbled into the liquid contained in the second vessel. The first vessel is partially filled with liquid hydrocarbon and the second vessel is partially filled with an aqueous solution of α-dextrin. The vapor effluent from the second vessel passes through a condenser to remove and recover condensable material from this vapor whereupon the vapor is discharged to the atmosphere, or recycled. The two vessels are enclosed in a constant temperature bath.

A first experiment is performed by placing a hydrocarbon solution containing 89.5% para xylene and 10.5% meta xylene in the first vessel, an aqueous solution of α-dextrin having a concentration of about 35.9 wt. percent in the second vessel and passing nitrogen gas through the apparatus. The constant temperature bath is maintained at 73° C. The vapor effluent from the second vessel called raffinate is condensed and the condensed composite is analyzed after each hour. The run is continued for 4 hours whereupon the solids in the second vessel are separated from the aqueous solution and heated to recover the hydrocarbons. The results of these recovered hydrocarbons show the solid clathrate to contain 4.06 wt. percent hydrocarbon (based on total α-dextrin) with its composition being 96.4% para xylene and 3.6 meta xylene. After 1 hour during this run, 4.6 ml. of raffinate were recovered which analyze 86.5% para xylene and 13.5% meta xylene. During the second hour, 7.7 ml. of raffinate were recovered which analyze 89.1% para xylene and 10.9% meta xylene. There was no substantial change in raffinate and its composition for the third and fourth hours. These results show a selectivity for para xylene $$\left(\frac{\text{para in solid/meta in solid}}{\text{para in liquid/meta in liquid}}\right)$$

of about 3.3.

Example 2

Another experiment was performed with the apparatus of Example 1. The first vessel was filled with meta xylene and nitrogen was passed through the apparatus. After the system came to equilibrium and solids were observed in the second vessel, the first vessel was emptied, cleaned, partially filled with para xylene and rehooked up to the apparatus. Nitrogen was again passed through the apparatus and after 1 hour, 6.2 ml. of raffinate were recovered which analyzed 77.7% para xylene and 22.3% meta xylene. This experiment clearly shows the ability of para xylene to displace the meta xylene from the solid clathrate.

Example 3

A series of runs are made wherein liquid hydrocarbon is contacted with an aqueous solution of $\alpha$-dextrin at various temperatures. An aqueous solution of $\alpha$-dextrin is placed in a vessel contained with a constant temperature bath. A hydrocarbon solution is added to the vessel, the mixture being agitated and allowed to come to equilibrium. The mother liquor is separated from the solids and each are separately analysed. These results are shown in Table 3.

It should be noted under these conditions that the selectivity for para xylene over meta xylene increases with increasing temperature over the specified range and although the total hydrocarbon complexed decreases with temperature, the concentration of the para-isomer in the hydrocarbon complexed increases. It should also be noted that ethyl benzene is selectively clathrated over meta xylene.

returned to the vessel at a point above the interface. Processing conditions are varied as shown in the following Table 4 along with the results.

TABLE 4

| Run | 1 | 2 | 3 | 4 |
|---|---|---|---|---|
| Temperature, ° C.: | | | | |
| Upper Portion | 100 | 100 | 100 | 100 |
| Lower Portion | 45 | 58 | 45 | 19 |
| $\alpha$-Dextrin Solution: | | | | |
| Concentration, g./100 cc | 7.2 | 7.2 | 14.0 | 11.9 |
| G. $\alpha$-Dextrin/hr | 74.4 | 30.2 | 84.0 | 50.0 |
| Hydrocarbon Feed: | | | | |
| Ml./hr. at 23° C | 14.96 | 14.96 | 17.14 | 12.22 |
| Ortho xylene | 34.1 | 33.8 | 17.4 | 17.2 |
| Meta xylene | 33.4 | 33.9 | 17.1 | 17.1 |
| Para xylene | 32.5 | 32.9 | 17.2 | 17.3 |
| 2,2,5-trimethylhexane LV% | 0 | 0 | 48.3 | 48.4 |
| Ml. xylenes/100 gr. $\alpha$-dextrin/hr | 20 | 48 | 10.5 | 13 |
| Recovery: | | | | |
| Solids LV% of charge | 9 | 1.4 | 6.0 | 2.8 |
| Ortho xylene | 17.4 | 19.5 | 15.0 | 15.9 |
| Meta xylene | 25.0 | 26.7 | 19.1 | 20.8 |
| Para xylene | 57.6 | 53.8 | 42.4 | 41.0 |
| 2,2,5-trimethylhexane | 0 | 0 | 23.5 | 22.3 |
| Ml./100 gr. $\alpha$-dextrin | 1.7 | 1.1 | 1.2 | 0.7 |
| Raffinate LV% of charge | 84 | 99 | 96.2 | 110.8 |
| Ortho xylene | 34.9 | 33.3 | 17.4 | 17.0 |
| Metha xylene | 34.1 | 37.7 | 16.8 | 17.4 |
| Para xylene | 31.0 | 33.0 | 15.0 | 16.5 |
| 2,2,5-trimethylhexane | 0 | 0 | 50.8 | 49.1 |
| Selectivity: | | | | |
| Para/meta xylene | 2.5 | 2.1 | 2.5 | 2.1 |
| Para/ortho xylene | 3.7 | 2.8 | 3.3 | 2.7 |
| Para/2,2,5-trimethylhexane | | | 6.1 | 5.3 |

TABLE 3

| Run No | 1 | | 2 | | 3 | | 4 | |
|---|---|---|---|---|---|---|---|---|
| | Grams | Percent | Grams | Percent | Grams | Percent | Grams | Percent |
| Material charged: | | | | | | | | |
| (a) Water | 184.8 | 94.6 | 188.0 | 94.5 | 84.7 | 89.5 | 65.1 | 89.1 |
| $\alpha$-Dextrin | 10.59 | 5.4 | 11.03 | 5.5 | 9.94 | 10.5 | 8.0 | 10.9 |
| (b) Ortho xylene | 1.154 | 15.5 | 1.390 | 15.5 | 2.00 | 15.5 | 3.25 | 13.0 |
| Meta xylene | 1.146 | 15.4 | 1.381 | 15.4 | 1.99 | 15.4 | 14.50 | 57.9 |
| Para xylene | 1.161 | 15.6 | 1.399 | 15.6 | 2.02 | 15.6 | 0.59 | 2.4 |
| Ethylbenzene | 0 | 0 | 0 | 0 | 0 | 0 | 6.68 | 26.7 |
| 2,2,4-trimethylpentane | 3.983 | 53.5 | 4.797 | 53.5 | 6.92 | 53.5 | | 0 |
| Temperature, ° C | | 0 | | 25 | | 55 | | 25 |
| Recovered in Clathrate: | | | | | | | | |
| Total | 9.025 | | 8.122 | | 5.168 | | 6.66 | |
| Ortho xylene | 0.099 | 13.3 | 0.063 | 11.6 | 0.015 | 6.2 | 0.016 | 4.4 |
| Meta xylene | 0.130 | 17.5 | 0.082 | 15.1 | 0.026 | 10.9 | 0.134 | 37.3 |
| Para xylene | 0.338 | 45.4 | 0.318 | 58.7 | 0.182 | 76.5 | 0.032 | 9.0 |
| Ethylbenzene | 0 | 0 | 0 | 0 | 0 | 0 | 0.177 | 49.3 |
| 2,2,4-trimethylpentane | 0.178 | 23.8 | 0.079 | 14.6 | 0.015 | 6.4 | | 0 |
| $\alpha$-Dextrin | 8.28 | 91.7 | 7.57 | 93.2 | 4.93 | 95.4 | 6.3 | 94.6 |
| Mother Liquor: | | | | | | | | |
| Ortho xylene | | 15.8 | | 15.7 | | 15.6 | | 13.1 |
| Meta xylene | | 15.5 | | 15.6 | | 15.5 | | 58.7 |
| Para xylene | | 13.2 | | 13.0 | | 14.5 | | 2.0 |
| Ethylbenzene | | 0 | | 0 | | 0 | | 26.2 |
| 2,2,4-trimethylpentane | | 55.5 | | 55.7 | | 54.4 | | 0 |
| Selectivity: | | | | | | | | |
| Para xylene/meta xylene | | 3.2 | | 4.7 | | 7.5 | | 7.1 |
| Para xylene/ethylbenzene | | | | | | | | 2.4 |

Example 4

Another apparatus comprising an elongated vessel having an upper portion, a lower portion and stirring means therein is utilized to conduct separation experiments. Each of said portions have separate heating means to control the temperature therein. A xylene feed mixture is introduced into the bottom of the lower portion (said lower portion containing an aqueous solution of $\alpha$-dextrin) and rises therethrough. The hydrocarbon mixture finally rises to the upper portion wherein an unclathrated hydrocarbon phase exists. This upper portion is maintained at a temperature sufficiently high to decompose any clathrate which may tend to accumulate in the upper hydrocarbon raffinate layer. The hydrocarbon is continuously removed from the top of the upper portion whereupon it is water washed to recover any dissolved $\alpha$-dextrin. The interface between the hydrocarbon phase and the aqueous solution is maintained between the upper portion and the lower portion. The solid clathrate that forms drops to the bottom of the lower portion where it is withdrawn from the vessel along with aqueous solution as a slurry. The slurry is introduced into a still maintained near 100° C. where the clathrate is decomposed and hydrocarbon and steam are removed overhead. The overhead is condensed and separated into a hydrocarbon phase and a water phase. The hydrocarbon phase is recovered and analyzed. The $\alpha$-dextrin solution from the still is It should be noted that there is a substantial increase in para xylene concentration in the extract recovered from the solid clathrate over that in the feed.

We claim as our invention:

1. A process for separating para xylene from a fluid mixture comprising $C_8$ aromatic hydrocarbons which comprises contacting the mixture with an aqueous solution of $\alpha$-dextrin under conditions to selectively form a solid para xylene clathrate and separating the solid clathrate from the remaining mixture.

2. The process of claim 1 further characterized in that the mixture is in the vapor phase when contacting the aqueous solution.

3. The process of claim 1 further characterized in that the fluid mixture consists essentially of para xylene, meta xylene, ortho xylene and ethylbenzene.

4. The process of claim 1 further characterized in that the fluid mixture consists essentially of para xylene, meta xylene and ethylbenzene.

5. The process of claim 1 further characterized in that the fluid mixture consists essentially of para xylene and meta xylene.

6. The process of claim 5 further characterized in that the solid clathrate is subjected to conditions to decompose the clathrate and the hydrocarbon freed therefrom is recovered.

7. The process of claim 6 further characterized in that the temperature in the clathrate forming step is at least 5° C. lower than the temperature in the clathrate decomposition step.

8. The process of claim 7 further characterized in that the temperature of the clathrate forming step is maintained at from about 50° C. to about 90° C. and the temperature in the clathrate decomposition step is maintained at from about 70° C. to about 110° C.

9. A crystalline material having a composition expressed in terms of a molecular ratio as follows:

1.0 α-dextrin:0.7±0.3 para xylene and an X-ray powder diffraction pattern essentially the same as that shown in Table 2.

10. The material of claim 9 further characterized in that said material exists at a temperature of from about 80° C. to about 90° C. in the presence of an aqueous solution of α-dextrin having an initial α-dextrin concentration above from about 10.5 weight percent to about 18.5 weight percent respectively and below from about 31.5 weight percent to about 40 weight percent respectively and in about linear temperature and concentration increments therebetween.

No references cited.

DELBERT E. GANTZ, Primary Examiner

C. R. DAVIS, Assistant Examiner

U.S. Cl. X.R.
106—208; 127—30